UNITED STATES PATENT OFFICE.

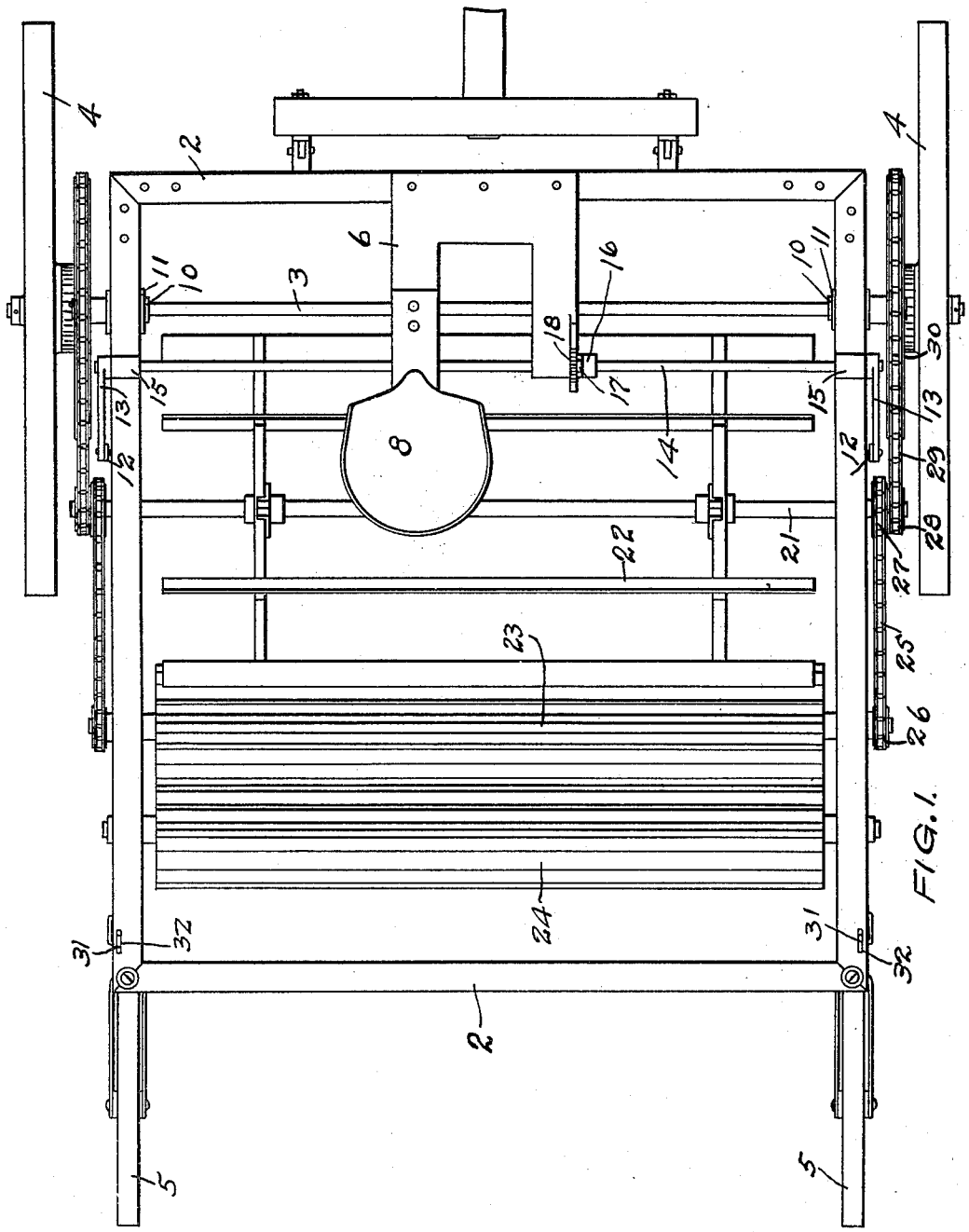

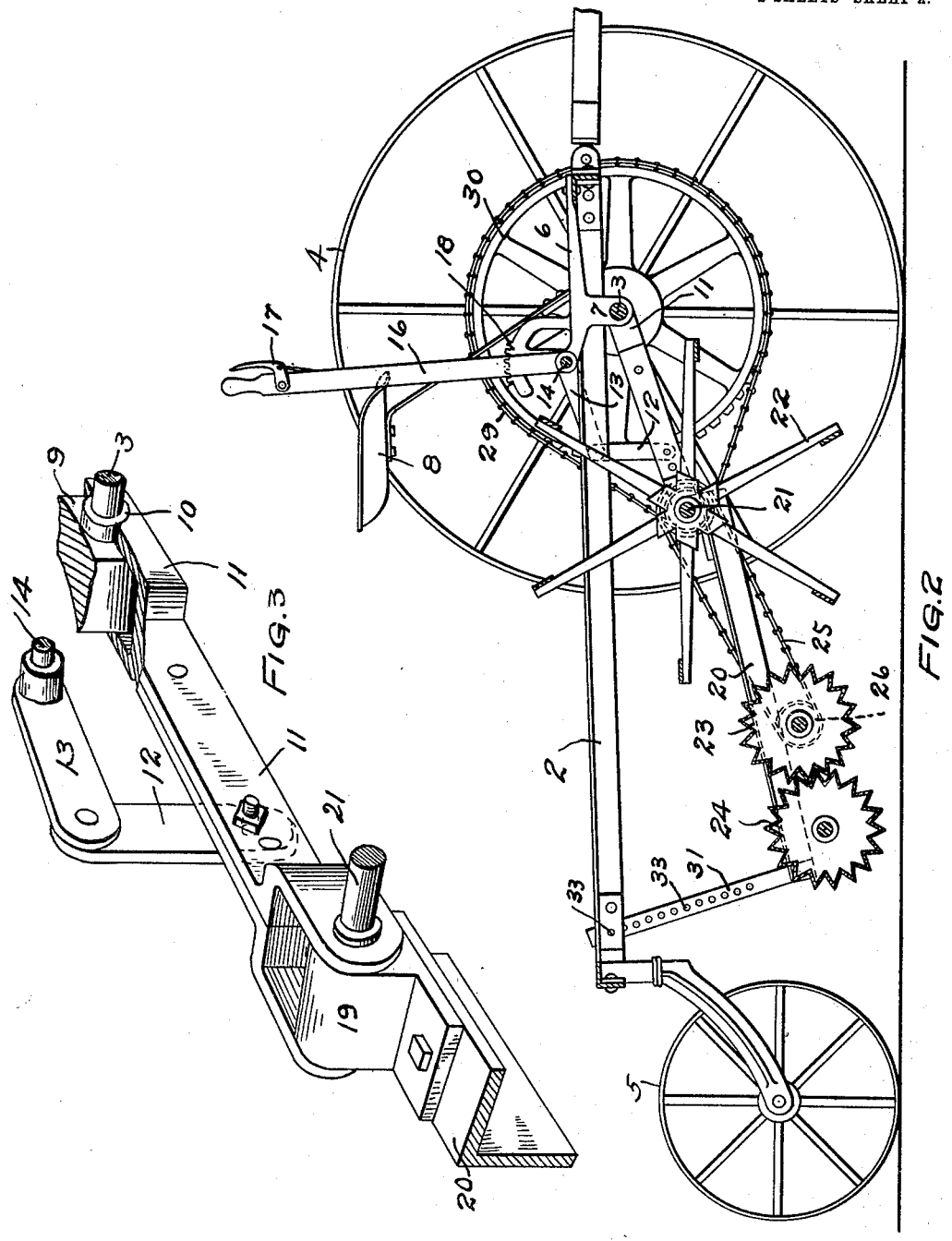

RICHARD RUSSELL, OF STEPHEN, MINNESOTA.

WEED-PULLER.

SPECIFICATION forming part of Letters Patent No. 722,048, dated March 3, 1903.

Application filed March 27, 1902. Serial No. 100,162. (No model.)

*To all whom it may concern:*

Be it known that I, RICHARD RUSSELL, of Stephen, Marshall county, Minnesota, have invented certain new and useful Improvements in Weed-Pullers, of which the following is a specification.

My invention relates to machines for pulling weeds from the soil; and the object of the invention is to provide an improvement over machines designed for a similar purpose and shown and described in Letters Patent of the United States issued to me December 19, 1899, No. 639,618, and October 23, 1900, No. 660,339.

The invention consists generally in providing a joint or hinge in the weed-pulling roll and reel-supporting frame to enable the operator to raise or lower the reel and the forward roll without altering the position of the rear roll.

Further, the invention consists in various constructions and combinations, all as hereinafter described, and particularly pointed out in the claims.

In the accompanying drawings, forming part of this specification, Figure 1 is a plan view of a weed-pulling machine embodying my invention. Fig. 2 is a longitudinal vertical section of the same. Fig. 3 is a detail perspective view showing the manner of hinging the sections of the reel and roll supporting frame together.

In the drawings, 2 represents a frame substantially rectangular in form and preferably of angle-iron on account of its strength and rigidity, mounted at its forward end upon an axle 3, provided with wheels 4, and at its rear end supported by the caster-wheels 5.

6 represents a plate secured to the forward rail of the frame 2, near the middle portion thereof, and provided with a depending lug 7, having a bearing for the axle, above which lug the seat 8 for the driver is secured.

9 represents blocks that are secured to the sides of the frame and have bearings for the axle and are provided with bosses 10, which form bearings for the forked forward ends of bars 11. These bars are connected by links 12 with cranks 13, provided on the ends of a shaft 14, that is mounted in bearings 15 on the frame 2 and is provided with a lever 16 near the seat 8, having the usual latch mechanism 17 to engage a rack or quadrant 18. By manipulating this lever 16 the operator can raise or lower the rear ends of the bars 12 and the mechanism connected therewith, their forward ends turning freely in the bearings on the blocks 9. The rear ends of the bars 11 are preferably forked, as well as their forward ends, and straddle blocks 19, secured to the bars 20. A shaft 21 passes through the rear forks of the bars 11 and the blocks 19 and carries a reel 22, that is adapted to engage the tops of the weeds and direct them into proper position to be engaged by the weed-pulling rolls. These rolls are arranged in suitable bearings on the bars 20, near the rear ends thereof, and are represented by reference-figures 23 and 24. The surfaces of the rolls are preferably corrugated and are arranged to interlock with each other, so that the movement of one roll will operate the other also, and they are preferably driven by means of chains 25, connecting sprockets 26 on the shaft of the forward roll with similar sprockets 27 on the reel-shaft, which in turn is provided with sprockets 28, connected by chains 29 with sprockets 30 on the axle of the machine. The forward ends of the bars 20 being pivoted on the reel-axle permit vertical adjustment of their rear ends, and to support said rear ends at the desired height from the ground I provide bars 31, connected to the bars 20 and slidable in slots 32 in the side bars of the machine-frame. The bars 31 are provided with a series of holes 33 to receive pins that are thrust into similar holes in the vertical flanges of the side bars of the machine-frame.

In the operation of the machine the rear roll 24 having been adjusted the desired distance from the ground will revolve when the forward roll is operated, but being near the pivots of the rear ends of the bars 20 will not be affected materially by any change in the position of the forward roll. The pivotal connection of the reel-axle with the forward ends of the bars 20 permits the reel to be raised or lowered and the position of the forward roll with respect to the rear roll to be altered at will, according to the character of the ground where the machine is used and the height of the weeds to be pulled. The forward ends of the bars 11 swing on the axle from which the reel-shaft is driven, and hence the reel is freely movable vertically to increase or decrease its distance from the work.

I claim as my invention—

1. The combination, with a wheeled frame, of an auxiliary frame pivoted thereon and composed of sections hinged together, a reel carried by the forward section, weed-pulling rolls mounted in bearings on the rear section, means supporting the rear end of said rear section, means for raising or lowering the hinged ends of said sections, and means for driving said reel and said rolls from the wheel-axle.

2. The combination, with a wheeled frame, of an auxiliary frame composed of two sections hinged together, the forward end section being pivoted on the wheel-axle and the rear section being suspended on the machine-frame, a reel mounted on said forward section near its connection with the rear section, weed-pulling rolls mounted on said rear section, means for driving said reel and said rolls, and means for raising or lowering the hinged ends of said sections to vary the distance of said reel from the ground.

3. The combination, with a wheeled frame, of an auxiliary frame pivoted to the axle thereof and comprising two sections hinged together, means for raising or lowering the rear end of the rear section, a reel mounted in bearings on the forward section, corrugated weed-pulling rolls having coacting surfaces mounted on said rear section, means for driving said reel and the forward roll from the machine-axle, and means for raising or lowering the hinged ends of said sections to change the position of said reel and the forward roll.

4. The combination, with a wheeled frame, of the bars 11 pivoted thereon, a shaft, an operating-lever therefor, cranks provided on said shaft, links connecting said cranks and said bars, a reel mounted on said bars and adapted to be raised or lowered by the movement of said lever, bars 20 pivotally connected near their forward ends with said bars 11, means adjustably supporting the rear ends of said bars 20, weed-pulling rolls carried by said bars 20, and means for driving said weed-pulling rolls and said reel from the machine-axle.

5. The combination, with a wheeled frame, of an auxiliary frame pivotally supported beneath the same and adjustable vertically, a reel carried by said auxiliary frame, weed-pulling rolls mounted in bearings on said auxiliary frame, means for driving said reel and said rolls, and means for raising or lowering said reel and the forward roll without changing the vertical adjustment of the rear end of said auxiliary frame.

6. The combination, with a wheeled frame, of an auxiliary frame adjustably supported beneath the same, a reel carried by said auxiliary frame, weed-pulling rolls mounted in bearings on said auxiliary frame, means for driving said reel and said rolls, and means for raising or lowering said reel without changing the adjustment of the rear end of said frame.

In witness whereof I have hereunto set my hand this 13th day of March, 1902.

RICHARD RUSSELL.

In presence of—
  RICHARD PAUL,
  M. C. NOONAN.